United States Patent
Brown et al.

(10) Patent No.: US 7,313,886 B2
(45) Date of Patent: Jan. 1, 2008

(54) FISHING ROD SECURING DEVICE

(76) Inventors: Bill D. Brown, 10620 SW. 83rd Ct., Miami, FL (US) 33156; Patrick B. Brown, 10620 SW. 83rd Ct., Miami, FL (US) 33156; Ryan M. Brown, 10620 SW. 83rd Ct., Miami, FL (US) 33156

( * ) Notice: Subject to any disclaimer, the term of this patent is extended or adjusted under 35 U.S.C. 154(b) by 0 days.

(21) Appl. No.: 11/458,416

(22) Filed: Jul. 19, 2006

(65) Prior Publication Data

US 2007/0017143 A1 Jan. 25, 2007

Related U.S. Application Data

(60) Provisional application No. 60/700,497, filed on Jul. 19, 2005.

(51) Int. Cl.
*A01K 87/08* (2006.01)
*A01K 87/00* (2006.01)

(52) U.S. Cl. ............................. 43/23; 43/21.2

(58) Field of Classification Search ................. 43/23, 43/21.2; 24/115 G, 136 R, 115 M, 115 R, 24/127
See application file for complete search history.

(56) References Cited

U.S. PATENT DOCUMENTS

| | | | | |
|---|---|---|---|---|
| 551,753 | A * | 12/1895 | Brewer | 24/115 R |
| 1,204,457 | A * | 11/1916 | Kreeft | 24/115 G |
| 1,318,085 | A * | 10/1919 | Kee | 43/23 |
| 1,518,205 | A * | 12/1924 | Kountz | 43/23 |
| 1,616,881 | A * | 2/1927 | Wharton | 24/115 G |
| 2,209,638 | A * | 7/1940 | Smith | 24/115 G |
| 2,226,897 | A * | 12/1940 | Cole | 43/23 |
| 2,241,183 | A * | 5/1941 | Ceder | 43/23 |
| 2,339,034 | A * | 1/1944 | Siska | 24/115 G |
| 2,360,402 | A * | 10/1944 | Determan | 43/21.2 |
| 2,448,384 | A * | 8/1948 | Meinzinger | 24/115 G |
| 2,471,623 | A * | 5/1949 | Hubbell | 24/115 G |
| 2,479,021 | A * | 8/1949 | Perkins | 43/23 |
| 2,482,625 | A * | 9/1949 | Kunkel | 24/115 G |
| 2,489,174 | A * | 11/1949 | Cunningham | 24/115 G |
| 2,497,820 | A * | 2/1950 | Kielland | 24/115 G |
| 2,524,649 | A * | 10/1950 | Buhler | 24/115 G |
| 2,528,799 | A * | 11/1950 | Strong | 43/23 |
| 2,539,080 | A * | 1/1951 | Hoover | 43/21.2 |
| 2,604,324 | A * | 7/1952 | Weir | 24/115 R |
| 2,614,788 | A * | 10/1952 | Woodward | 24/115 G |
| 2,667,695 | A * | 2/1954 | Price | 24/115 G |
| 2,682,649 | A * | 6/1954 | Blonder | 24/115 G |

(Continued)

FOREIGN PATENT DOCUMENTS

GB 2264215 A * 8/1993

(Continued)

*Primary Examiner*—Darren W. Ark
(74) *Attorney, Agent, or Firm*—Akerman Senterfitt; J. Rodman Steele, Jr.; Peter A. Chiabotti

(57) ABSTRACT

A fishing rod securing device includes a housing where the housing has a first end for securing the fishing rod to a structure and a second end for coupling to a fishing rod. The first end has a passage at which the structure can be received. Also, the housing provides a biased element where the biased element detachably clamps the structure in the structure passage.

4 Claims, 9 Drawing Sheets

U.S. PATENT DOCUMENTS

| | | | | |
|---|---|---|---|---|
| 3,006,098 A | * | 10/1961 | Harke | 43/23 |
| 3,058,251 A | * | 10/1962 | Brooks | 43/21.2 |
| 3,081,575 A | * | 3/1963 | Meisner | 24/127 |
| 3,102,708 A | * | 9/1963 | Crain | 24/115 R |
| 3,154,274 A | * | 10/1964 | Hillcourt | 43/21.2 |
| 3,259,366 A | | 7/1966 | Castoe | |
| 3,350,753 A | * | 11/1967 | Hester | 24/600.7 |
| 3,443,335 A | * | 5/1969 | Guydos | 43/23 |
| 3,468,052 A | * | 9/1969 | Hardesty et al. | 43/23 |
| 3,510,922 A | * | 5/1970 | Dzus et al. | 411/555 |
| 3,531,888 A | * | 10/1970 | Wells et al. | 43/23 |
| 3,597,808 A | * | 8/1971 | Johnson | 24/127 |
| 3,604,069 A | * | 9/1971 | Jensen | 24/115 G |
| 3,745,690 A | * | 7/1973 | Lewis | 43/21.2 |
| 3,792,829 A | * | 2/1974 | Fickett | 43/21.2 |
| 3,868,748 A | * | 3/1975 | Kelly | 24/115 M |
| 3,885,721 A | * | 5/1975 | Vanus | 224/922 |
| 3,959,913 A | * | 6/1976 | Weber | 24/908 |
| 3,964,706 A | * | 6/1976 | Adams | 43/21.2 |
| 4,017,998 A | * | 4/1977 | Dumler | 43/23 |
| 4,081,115 A | * | 3/1978 | White et al. | 248/514 |
| 4,083,141 A | * | 4/1978 | Shedd et al. | 43/23 |
| 4,262,394 A | | 4/1981 | Wright | |
| 4,375,731 A | * | 3/1983 | Budd | 43/21.2 |
| 4,407,089 A | * | 10/1983 | Miller | 43/21.2 |
| 4,453,292 A | * | 6/1984 | Bakker | 24/115 G |
| 4,485,579 A | * | 12/1984 | Hawie | 43/21.2 |
| 4,498,257 A | * | 2/1985 | Jekel | 43/23 |
| 4,528,768 A | * | 7/1985 | Anderson | 43/21.2 |
| 4,622,723 A | * | 11/1986 | Krauss | 24/115 G |
| 4,637,157 A | * | 1/1987 | Collins | 43/23 |
| 4,658,534 A | * | 4/1987 | McLean | 43/21.2 |
| 4,688,346 A | * | 8/1987 | Collins | 43/23 |
| 4,707,891 A | * | 11/1987 | Chidester | 24/136 R |
| 4,803,759 A | * | 2/1989 | Kemble | 24/30.5 R |
| 4,831,763 A | * | 5/1989 | Alcorn | 43/21.2 |
| 4,836,127 A | * | 6/1989 | Wille | 43/21.2 |
| 4,858,364 A | * | 8/1989 | Butts | 43/21.2 |
| 4,887,375 A | * | 12/1989 | Shedd et al. | 43/21.2 |
| 4,995,188 A | * | 2/1991 | Ewing | 43/23 |
| 5,115,598 A | * | 5/1992 | Shaw | 43/21.2 |
| 5,522,169 A | * | 6/1996 | Heller | 43/23 |
| 5,697,184 A | * | 12/1997 | Heller | 43/23 |
| 5,806,902 A | * | 9/1998 | Kliest | 24/136 R |
| 5,890,313 A | * | 4/1999 | Collins | 43/23 |
| 5,967,075 A | * | 10/1999 | Johansen | 43/21.2 |
| 5,987,803 A | * | 11/1999 | White | 43/21.2 |
| 6,125,572 A | * | 10/2000 | Collins | 43/23 |
| 6,176,034 B1 | * | 1/2001 | Collins | 43/23 |
| 6,460,285 B2 | * | 10/2002 | Collins | 43/23 |
| 6,557,292 B1 | * | 5/2003 | Howard | 43/21.2 |
| 6,626,409 B1 | * | 9/2003 | Thompson | 43/21.2 |
| 2005/0102881 A1 | * | 5/2005 | Legendziewicz | 43/21.2 |
| 2005/0172534 A1 | * | 8/2005 | Arcabascio | 43/21.2 |
| 2006/0277813 A1 | * | 12/2006 | Saldana | 43/21.2 |

FOREIGN PATENT DOCUMENTS

| | | | | |
|---|---|---|---|---|
| JP | 61-206495 A | * | 9/1986 | |
| JP | 9-233976 A | * | 9/1997 | |
| JP | 11-155426 A | * | 6/1999 | |
| JP | 11-178478 A | * | 7/1999 | |
| JP | 11-318280 A | * | 11/1999 | |
| JP | 2000-300125 A | * | 10/2000 | |
| JP | 2000-354437 A | * | 12/2000 | |
| JP | 2001-57830 A | * | 3/2001 | |
| JP | 2001-61379 A | * | 3/2001 | |
| JP | 2001-169687 A | * | 6/2001 | |
| JP | 2001-204310 A | * | 7/2001 | |
| JP | 2001-269087 A | * | 10/2001 | |
| JP | 2001-314140 A | * | 11/2001 | |
| JP | 2001-352864 A | * | 12/2001 | |
| JP | 2002-17210 A | * | 1/2002 | |
| JP | 2002-45092 A | * | 2/2002 | |
| JP | 2002-58395 A | * | 2/2002 | |
| JP | 2002-65123 A | * | 3/2002 | |
| JP | 2002-330675 A | * | 11/2002 | |
| JP | 2003-102346 A | * | 4/2003 | |
| JP | 2003-116408 A | * | 4/2003 | |
| JP | 2004-15042 A | * | 6/2004 | |
| JP | 2006-223148 A | * | 8/2006 | |

* cited by examiner

FISHING ROD SECURING DEVICE

CROSS-REFERENCE TO RELATED APPLICATIONS

This application claims benefit of U.S. Provisional Application Ser. No. 60/700,497, filed in the U.S. Patent and Trademark Office on Jul. 19, 2005, the entirety of which is herein incorporated by reference.

FIELD OF THE INVENTION

The present invention relates to fishing rod holders, and more particularly, to devices for securing stored fishing rods.

BACKGROUND OF THE INVENTION

Advancements in fishing tackle have resulted in fishing rod and reel combinations costing hundreds, or even thousands of dollars. Understandably, owners attempt to take great care of their fishing tackle. As one example of such care, deep sea fishing anglers commonly store their fishing rods in upright holders during transit to and from fishing locations. The upright holders support the rods in a conveniently stored position and prevent the rod from lying on the deck of the boat where the rod may be trampled over and broken.

The upright holders, which are shaped as cylindrical tubes for receiving the end of a fishing rod, attempt to store the fishing rods by relying on the weight of the fishing rod and tackle to prevent inadvertent removal from the holder. Although such an arrangement generally works during calm sea conditions or when the boat is traveling at low speeds, loss of rods and reels are common during rough sea conditions and during high speed traveling. For instance, if a boat is traveling at a high rate of speed and it encounters a sizeable wave, the rods, with all of their expensive tackle, may be inadvertently ejected from the rod holders and, sometimes, fall out of the boat.

Although anglers can travel slowly to help prevent the loss of rods and reels, in many fishing competitions, high speed travel to a distant fishing location can provide the advantage of more time spent fishing, and less time spent traveling. Thus, it is routine for anglers, particularly competition anglers, to travel to a desired fishing location at very high speeds to minimize traveling time and to maximize fishing time. These anglers, in particular, use very expensive fishing rods, reels and tackle and these anglers have used various devices to help secure the fishing rods to upright holders to prevent loss.

For instance, some anglers use a plurality of elastic cords to secure the fishing rods to the upright holders. To secure a rod to the upright holder with elastic cords, the cords are hooked to various parts of the fishing rod and reel and to the upright holder. Such an arrangement is inherently imprecise and can be ineffective in the event that an angler does not hook the elastic cord to appropriate locations on the rod and/or the holder. Accordingly, even with the use of elastic cords, fishing rods can still be lost. Further, it is not uncommon for a few of the plurality of elastic cords to become unhooked during travel and become ensnarled with the fishing rod, line and tackle creating a tangled and inoperable fishing rod that ultimately results in the loss of fishing time.

Accordingly, there is a need for an easy to operate device for securing fishing rods to upright holders. There is also a need for the device to allow quick removal of the rod from the upright holder.

SUMMARY

The present invention provides a fishing rod securing device that can be detachably coupled to a fishing rod or can be integrated with a fishing rod. The device can be attached to the handle end of a fishing rod in any suitable manner, such as with an adhesive or even a screw, or can simply be removably inserted onto the handle end of a fishing rod. Accordingly, the securing device can be used in conjunction with existing fishing rods. The securing device removably clamps a fishing rod to any suitable structure, such as a rod located at the base of a cylindrical upright fishing rod holder. With the securing device clamping the fishing rod to a suitable structure, the fishing rod is prevented from inadvertently being removed from its storage position and possibly being lost, such as falling out of a boat during transit.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE PREFERRED EMBODIMENTS

The present invention provides a fishing rod securing device that can be detachably coupled to a fishing rod or can be integrated with a fishing rod. The device can be attached to the handle end of a fishing rod, also referred to as a rod butt, in any suitable manner, such as with an adhesive or even a screw, screw fit, press fit, or can simply be removably inserted onto the handle end of a fishing rod. Accordingly, the securing device can be used in conjunction with existing fishing rods. The securing device removably clamps a fishing rod to any suitable structure, such as a bar located at the base of a cylindrical upright fishing rod holder. With the securing device clamping the fishing rod to a suitable structure, the fishing rod is prevented from inadvertently being removed from its storage position and possibly being lost, such as falling out of a boat during transit.

Figure 1:
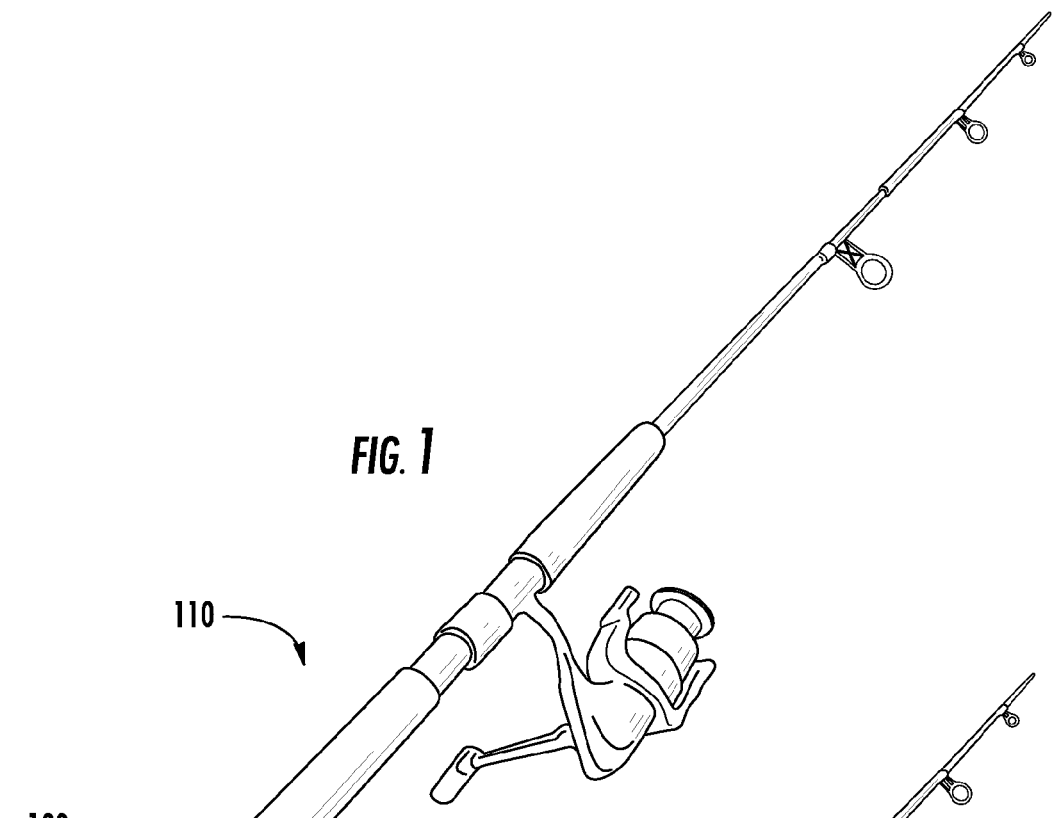
FIG. 1 is a perspective view of one embodiment in accordance with the inventive aspects.
Figure 2:
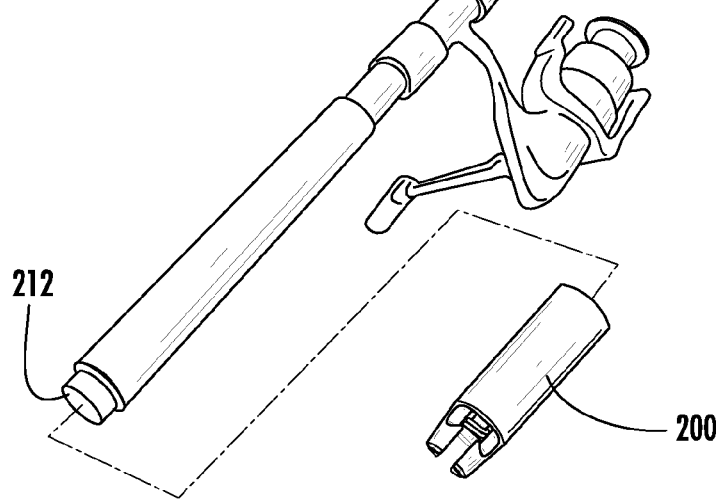
FIG. 2 is an exploded perspective view of another embodiment in accordance with the inventive aspects.

FIG. 1 illustrates the fishing rod 110 integrated with the securing device 100. As shown, the fishing rod 110 and securing device 100 can form one unit, such as a rod handle with securing device 100 formed of aluminum. Nevertheless, as illustrated in FIG. 2, fishing rod 210 and securing device 200 can be separate components where the securing device 200 can be attached to the fishing rod 210. The fishing rod 210 can have a handle with end 212 that is shaped to easily insert in the securing device 200. Although such a shaped end 212 can offer benefits of easy attachment, or even a detachable arrangement that would allow for cleaning and/or replacement of parts of the securing device, such a shaped end 212 is not necessary. The securing device 200 can be attached to the end of an existing fishing rod in any suitable manner, such as with an adhesive, a screw fit or press fit arrangement, or the fishing rod can simply be inserted into the securing device 200.

Figure 5:
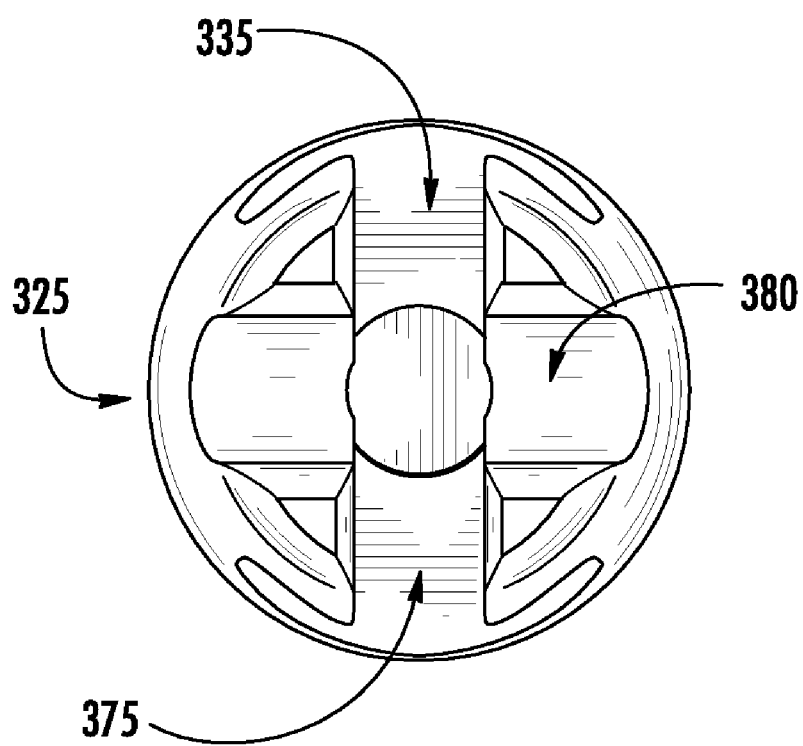
FIG. 5 illustrates a bottom view of the embodiment of FIG. 3 in accordance with the inventive aspects.
Figure 6:
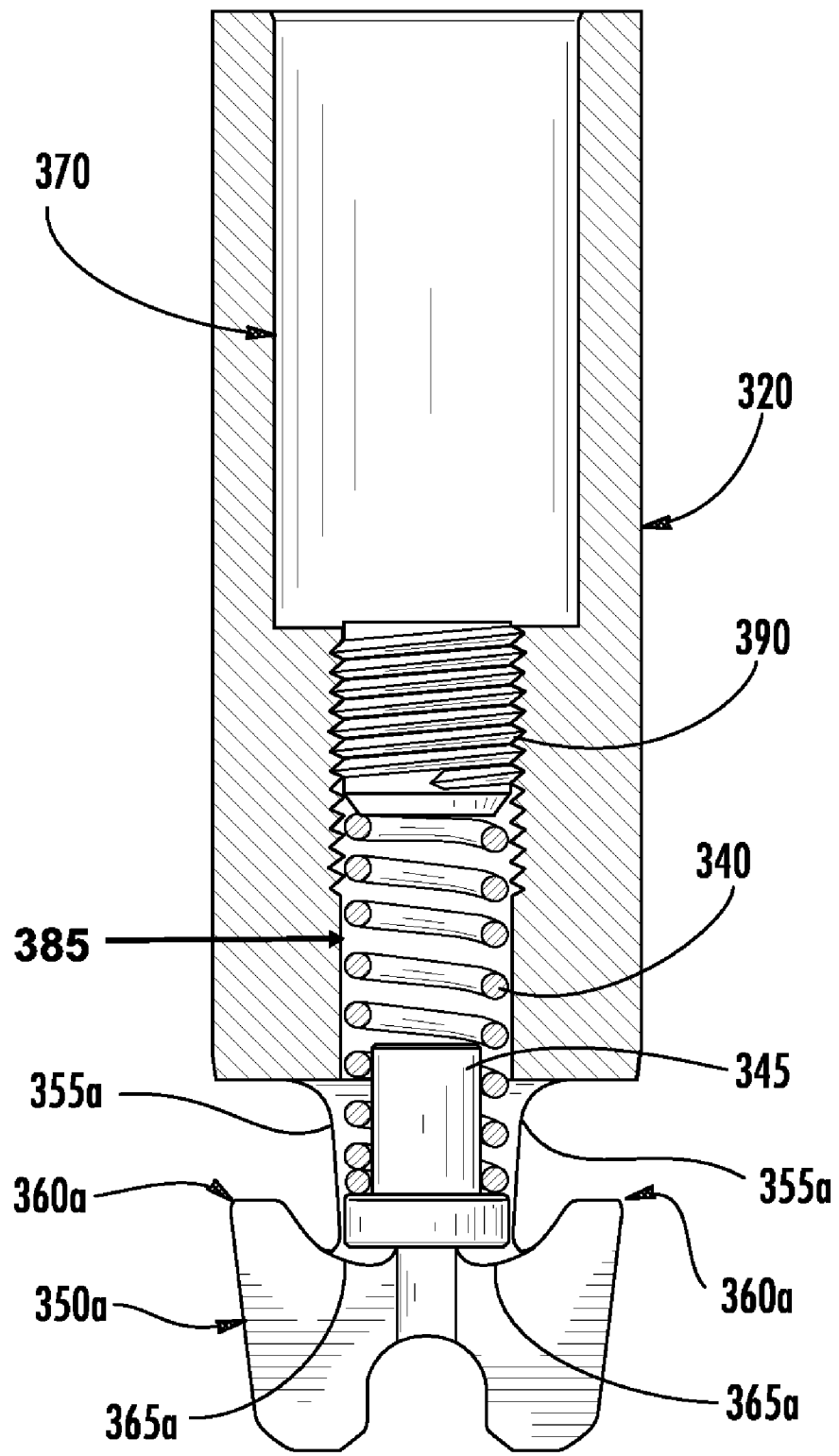
FIG. 6 illustrates a cross-sectional view of the embodiment of FIG. 3 taken along lines 6-6 in accordance with the inventive aspects.
Figure 7:
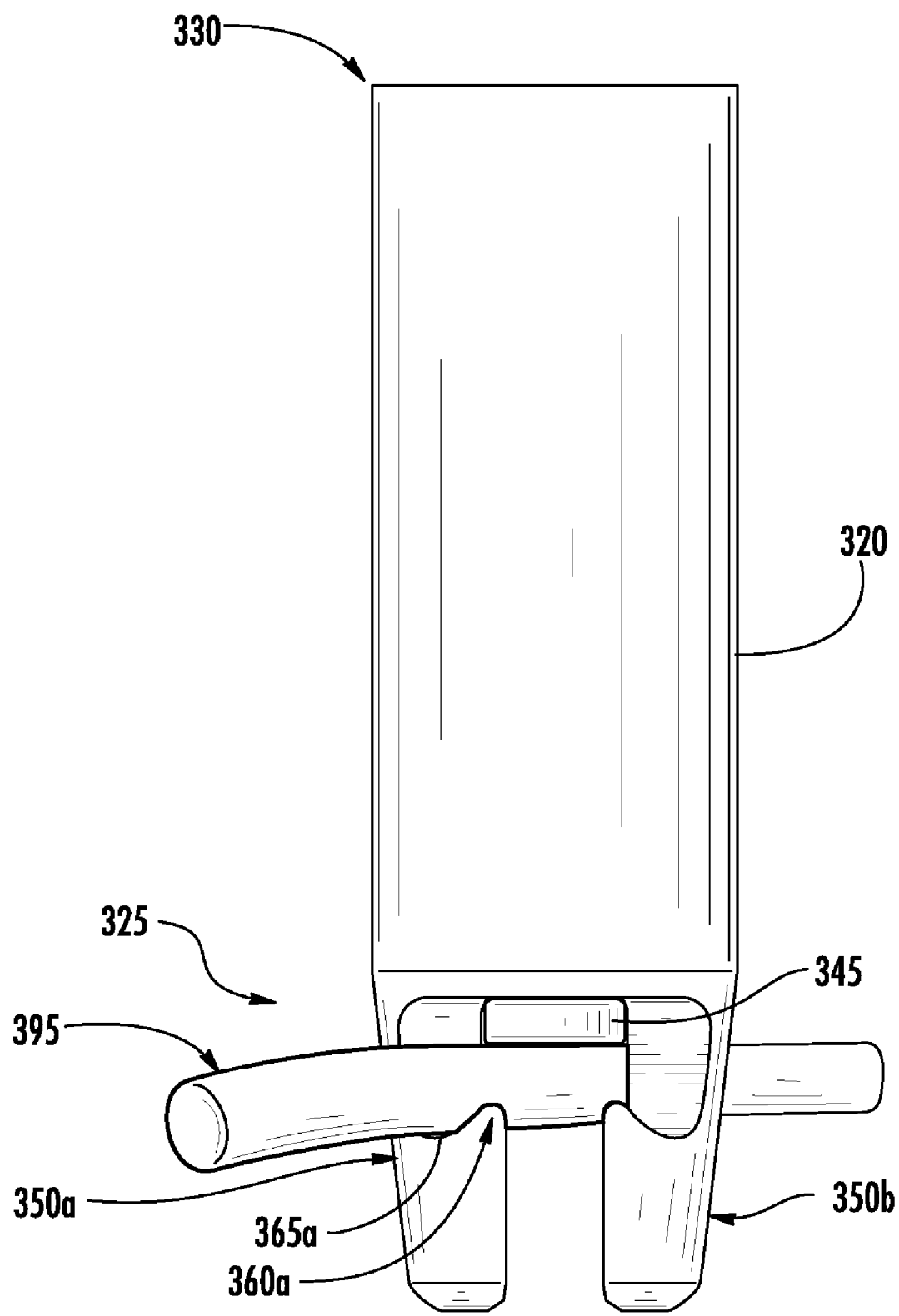
FIG. 7 illustrates the embodiment of FIG. 3 secured to a structure in accordance with the inventive aspects.

FIGS. 3-7 illustrate one embodiment of a securing device 300 in accordance with the inventive arrangements. The securing device 300 includes a housing 320 having a first end 325 and a second end 330, a passage 335 and a biased element 340 with a plunger 345. The first end 325 can be for securing the fishing rod to a structure 395, as shown in FIG. 7, and the second end 330 can be for coupling to a fishing rod, as shown in FIG. 1.

At the second end 325, the passage 335 can be formed by opposing structures 350a and 350b which depend from the housing 320. The surfaces 355a and 355b of the opposing structures can be beveled to allow for smooth insertion and removal of the structure to which the securing device 300 is clamped. The opposing structure 350a can provide two hooked portions 360a and the opposing structure 350b can provide two hooked portions 360b. The hooked portions 360a and 360b can provide curved surfaces 365a and 365b, which are the resting surfaces to which the structure 395 can be clamped. The curved surfaces 365a and 365b can be positioned along a diameter of the housing 320 such that the structure 395 passes through passage 335 along a diameter of the housing 320, as shown in FIG. 7. Also, channel 375 provides access to passage 335 and is located between opposed structures 350a and 350b. The passage 335 can be any suitable size for ensuring that the securing device 300 can be moved onto the structure 395 and the structure 395 can be clamped to surfaces 365a and 365b.

Figure 4:
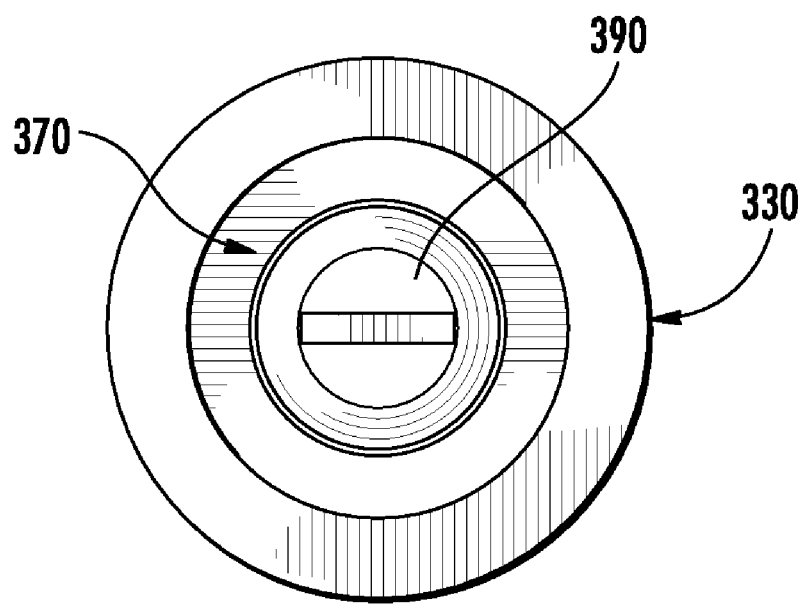
FIG. 4 illustrates a top view of the embodiment of FIG. 3 in accordance with the inventive aspects.

As shown in FIG. 4, the housing 320 can be cylindrical with an opening to a relatively large cavity 370 at the first end 330. The cavity 370 can receive the end of a fishing rod for removably coupling the securing device 300 to the rod. The cavity 370 can be any suitable size for snuggly fitting on any sized rod handle. In one arrangement, the shape of cavity 370 can correspond to the shape of a common rod end. Furthermore, the housing 320 can be any shape suitable for use on the end of a rod. Adhesives, or even screws can be used to fasten the rod handle to cavity 370.

As shown in FIG. 5, the channel 375 at first end 325 can provide a pathway for allowing the securing device 300 to be positioned such that the structure 395 passes through the passage 335. Furthermore, a groove 380 can be provided for engaging a pin on a standard fishing support belt or rod holder. In this arrangement, the securing device 300 does not alter the manner in which an angler uses such a support belt or rod holder.

Figure 3:
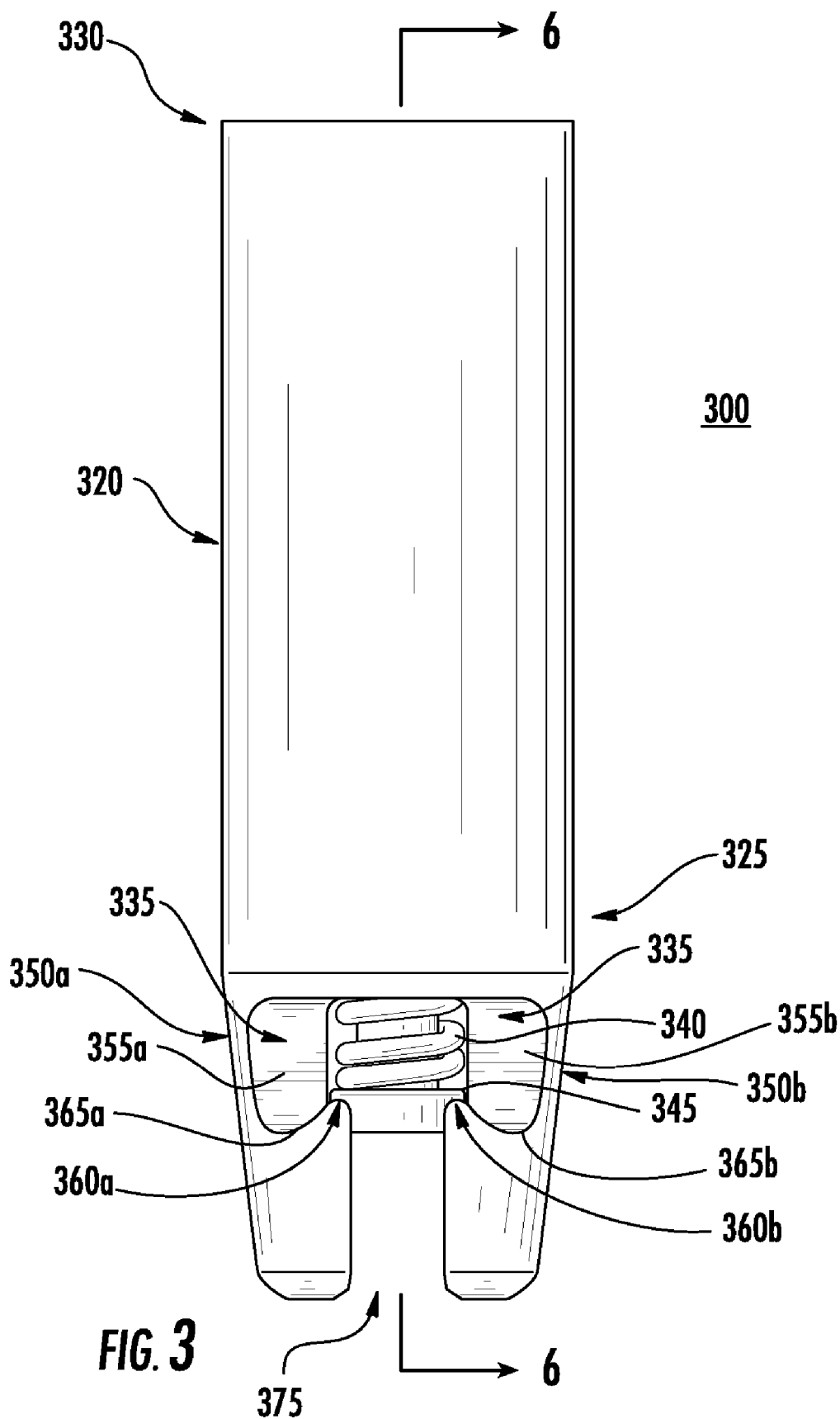
FIG. 3 illustrates a frontal view of one embodiment of a fishing rod securing device in accordance with the inventive aspects.

FIG. 6 is a cross-sectional view of the securing device 300 taken along lines 6-6 of FIG. 3. In this view, only one opposing structure 350a, which depends from the housing 320, is shown. The beveled surface 355a is shown spanning the opposing structure 350a. Two hooked portions 360a and the two curved surfaces 365a are also shown.

The biased element 340 with plunger 345 is shown disposed in cavity 385 and removably attached to the housing with bushing 390. The bushing 390 can be threaded to allow for easy removal of the biased element 340 and plunger 345 for cleaning and/or replacement. Nevertheless, the biased element 340 can also be attached to the housing 320 with any suitable structure, including irremovable couplings.

The biased element 340 can be a spring or any other suitable structure for creating a clamping force. The amount of force provided by the spring can be enough to provide a secure clamping force, while still allowing the user to easily clamp and unclamp the fishing rod from its secured position. In the arrangement shown, the biased element 340 can be compressed to biased position when a structure 395 is inserted into the passage 335 such that the biased element 340 creates a clamping force, securing the structure 395 between plunger 345 and curved surface 365a and 365b (not shown).

FIG. 7 illustrates the securing device 300 clamped to a structure 395 with the plunger 345 and the biased element 340 (not shown) in a biased position. It should be noted that the structure 395 can be any structure of any size and shape, such as a cylindrical or rectangular bar commonly located at the bottom of upright rod holders. In the biased position, the biased element 340 and plunger 345 exert a force in the direction towards the curved surface 365a. In this arrangement, the biased element 340 and the plunger 345 have securely clamped the structure 395 to the curved surface 365a of one opposing side 350a and to the curved surface 365b (not shown) of opposing side 350b while the structure 395 extends through passage 335 along a diameter of the housing 325.

Figure 8:
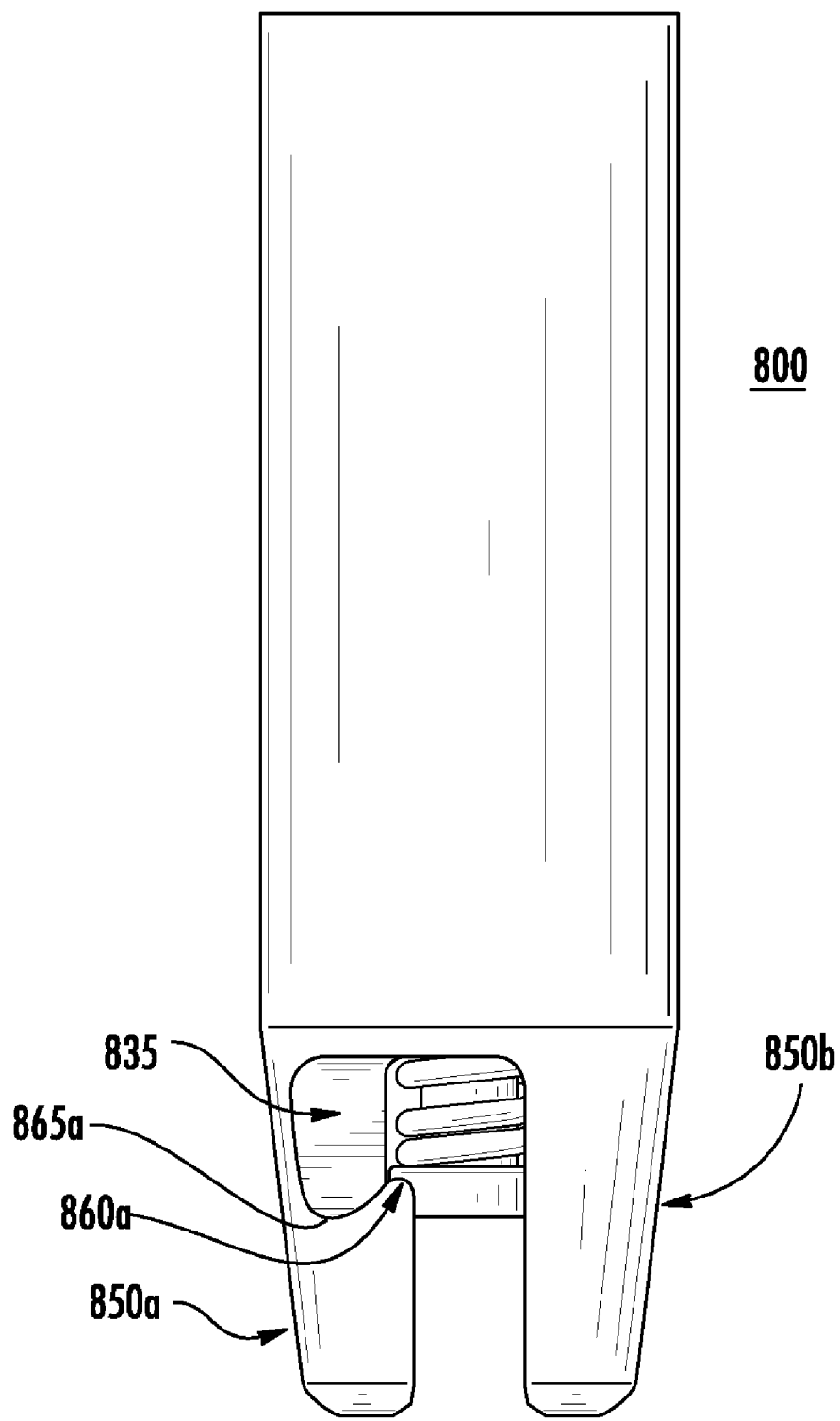
FIG. 8 illustrates another embodiment of a fishing rod securing device in accordance with the inventive aspects.

FIG. 8 illustrates another embodiment of a securing device 800 where each depending opposing side 850a and 850b provides only one hooked portion 860a and 860b (not shown). In this embodiment, the structure to which the securing device 800 is clamped passes through a passage 835 and is secured against curved surface 865a and 865b (not shown).

Figure 9:
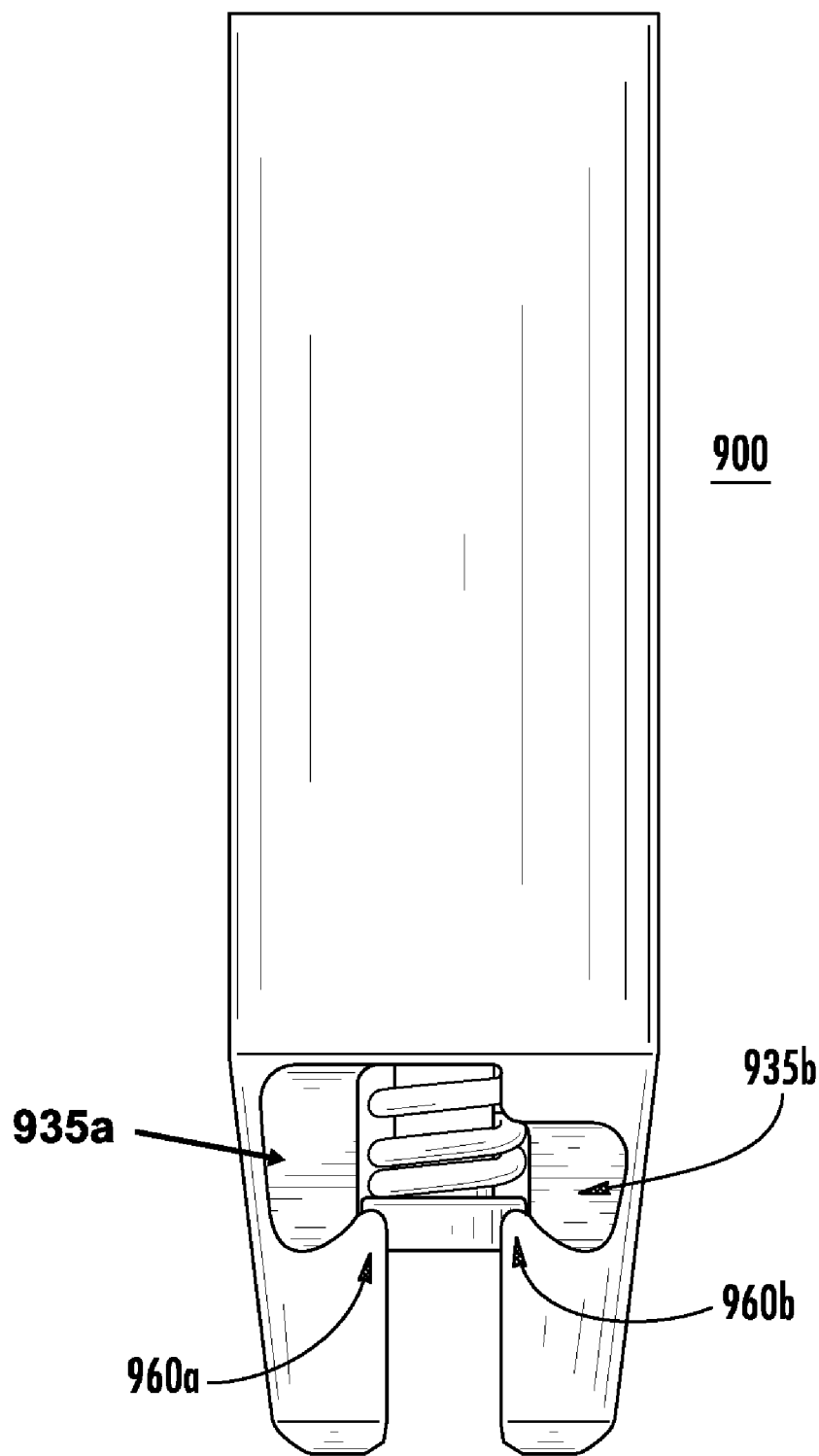
FIG. 9 illustrates yet another embodiment of a fishing rod securing device in accordance with the inventive aspects.

FIG. 9 illustrates yet another embodiment of a securing device 900 that can be clamped to different sized or shaped structures. The first passage 935a is at least partially defined by the first hooked portion 960a and the first hook portion 960b (not shown) and is larger in size relative to the second passage 935b defined at least partially by hook portion 960b and hook portion 960a (not shown). The first passage 935a and the second passage 935b cross at the center of housing 925 and can accommodate different sized and shaped structures to which a fishing rod can be securely clamped.

Figure 10:
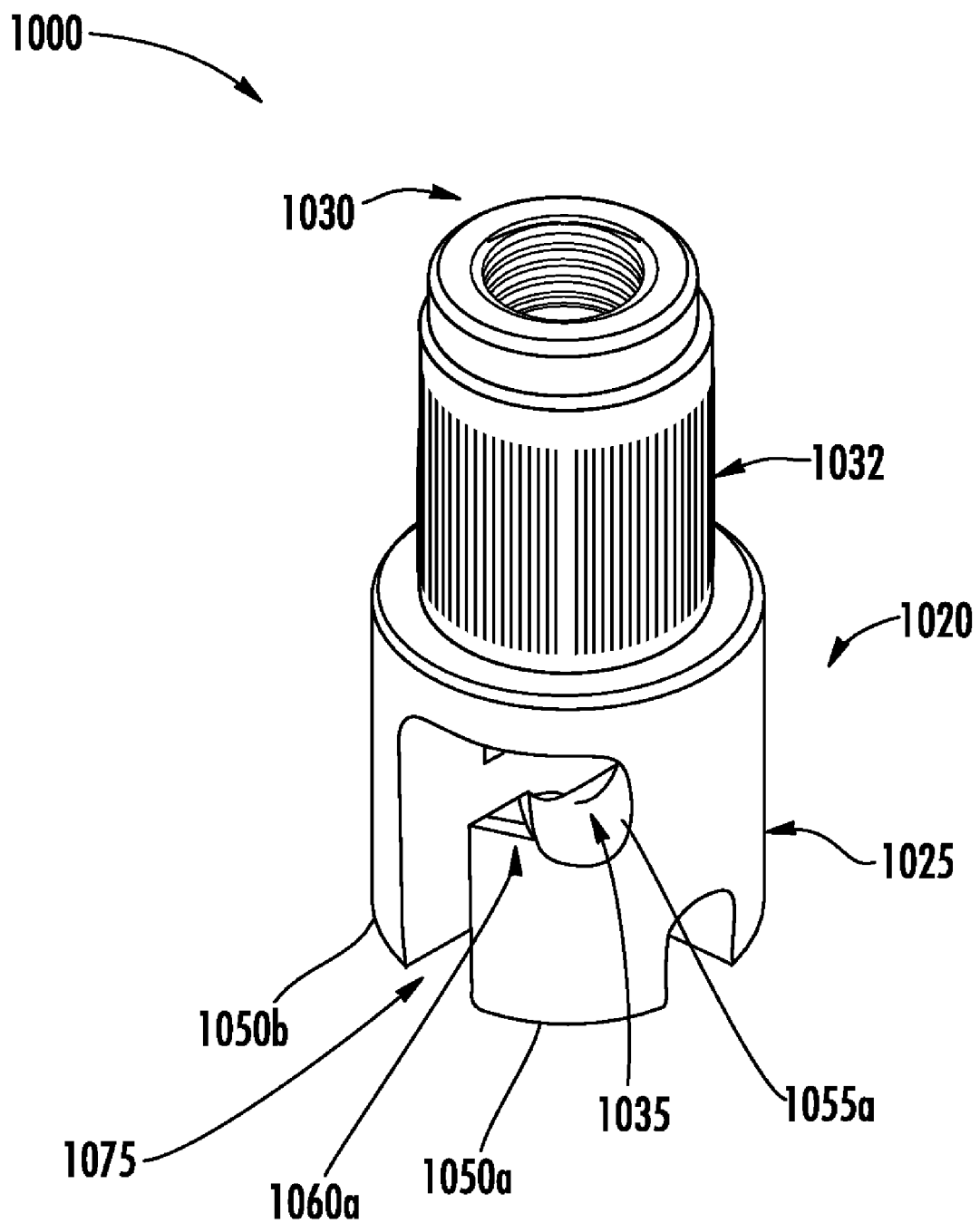
FIG. 10 illustrates yet another embodiment of a fishing rod securing device in accordance with the inventive aspects.

FIG. 10 illustrates yet another embodiment of a securing device 1000 that can be clamped to different sized or shaped structures. The securing device 1000 can include housing 1020 with first end 1025 and second end 1030, a passage 1035, a biased element (not shown), opposing structures 1050a and 1050b (not shown), surfaces 1055a and 1055b (not shown), hook portions 1060a and 1060b (not shown) and channel 1075, similar to the structures discussed previously. Nevertheless, the second end 1030 of securing device 1000 has a smaller diameter than the first end 1025 for insertion into a cavity provided by the rod butt (not shown). Raised ridges, such as knurl 1032, can be provided along the length of the second end 1030 for ensuring a snug fit. Still further, an adhesive, such as any suitable epoxy, can coat the second end 1030 in addition to, or without, knurl 1032 to ensure that the securing device 1000 is suitably coupled with the rod butt. Such an embodiment provides the ability to retrofit fishing rods with the securing device 1000.

In operation and with reference to FIGS. 3-7, the securing device 300 can be placed such that the structure 395 is received in channel 375. The securing device 300 can be forced in a direction such that the biased element 340 and plunger 345 are retracted into the housing 325. Once the securing device 300 has been moved to a position such that the structure 395 is in the passage 335 and the plunger 345 and biased element 340 have been moved slightly passed the biased position, the securing device 300 can be rotated past the tips of hooked portions 360a and 360b and the structure 395 can be forced against curved surfaces 365a and 365b. Additionally, the biased element 340 can move slightly in the direction of the biasing force to clamp the structure 395 against curved surfaces 365a and 365b. It should be noted that opposing sides 350a and 350b with dual hooked portions 360a and 360b allow for securing a fishing rod by rotating in either direction, which can advantageously orientate the fishing reel on either side of a boat.

To remove the securing device 300, and the fishing rod, from the structure 395, the biased element 340 can be moved slightly in the direction against the biased force a distance that the structure 395 can clear the tips of the hooked portions 360a and 360b. Once cleared of the tips, the securing device 300, and possibly the entire fishing rod, can be rotated to allow removal of the securing device 300. The securing device 300 can be moved such that the structure 395 can pass from the passage 335 and out of channel 375. Thus, the securing device 300 provides redundant securing structures of the hooked portions 360a and 360b along with the clamping provided by the biased element 340 and plunger 345. Additionally, the hooked portions 360a and 360b prevent inadvertent rotation.

Figure 11:
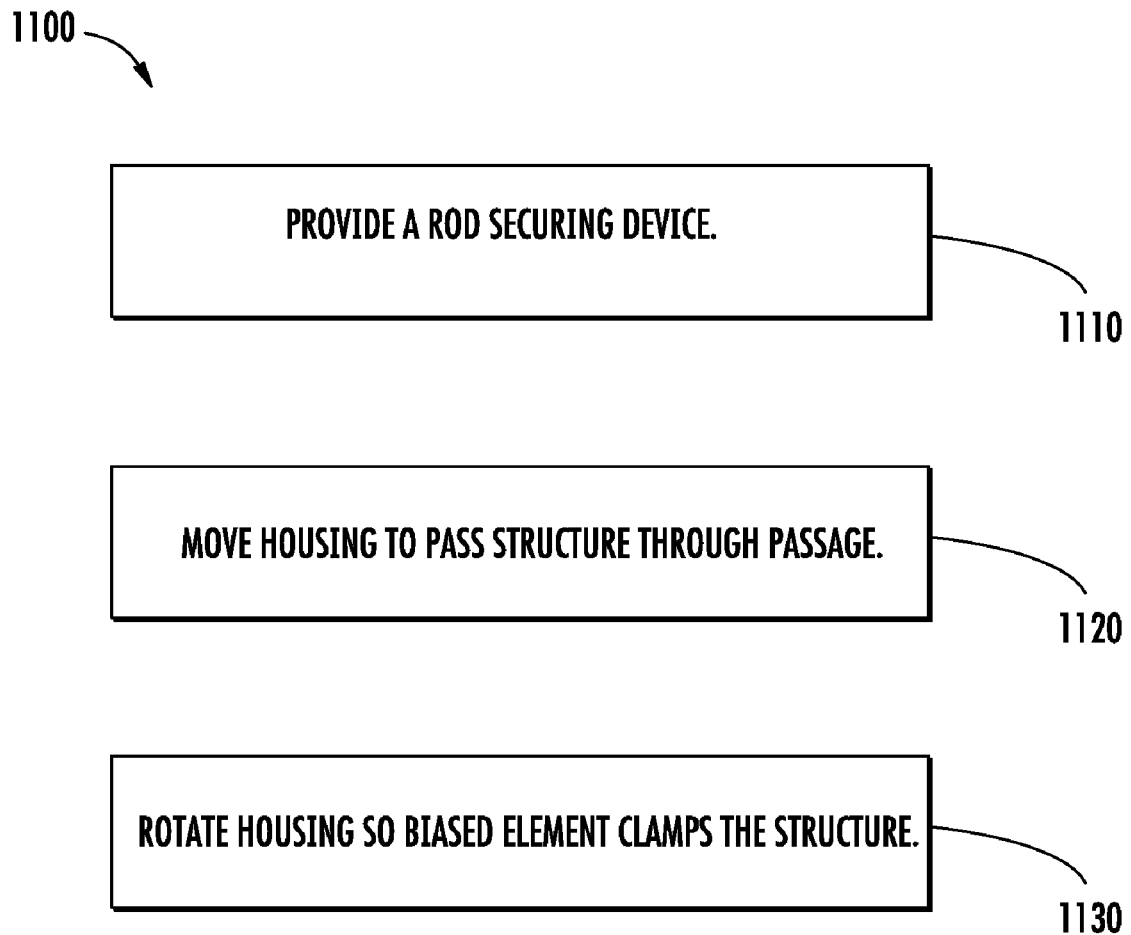
FIG. 11 is a flow chart of a method of securing a fishing rod to structure in accordance with the inventive arrangements.

FIG. 11 provides a flow chart of one arrangement of a method of securing a fishing rod to a structure. Although the method 1100 is discussed with reference to the components discussed herein, it should be noted that the method can be practiced without limitation to particular components.

In step 1110, a fishing rod securing device can be provided. The rod securing device can have a housing with a first end for securing the fishing rod to the structure. As noted previously, the rod securing device can be integrated with the rod butt or can be a separate component that is attachable to the rod butt.

In step 1120, the housing of the fishing rod securing device be orientated such that the structure passes through a passage provided by the housing of the fishing rod securing device. As an example, the fishing rod with fishing rod securing device attached or integrated with the fishing rod butt can be placed over a bar small enough to pas through a channel in the housing and result in with the rod traversing through the housing passage.

In step 1130, the housing, along with the entire fishing rod, can be rotated such that the biased element detachably clamps the structure to the housing. Continuing with the example started with reference to step 1120, with bar traversing through the housing passage, the entire fishing rod can be rotated until the bar rests in a hooked portion of the housing and the biased element detachably clamps the structure to the housing. To remove the fishing rod, the steps, 1130 and 1120 can be completed in reverse order.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A fishing rod securing device in combination with a fishing rod having at least one eyelet thereon, comprising:
a fishing rod securing housing, said fishing rod securing housing being cylindrically shaped and having a central longitudinal axis, a first end for securing said fishing rod to a structure and a second end coupled to the fishing rod;
said first end having two opposing structures that extend axially away from said first end of said housing, said two opposing structures provide a hooked portion on each opposing structure, a channel substantially concentric with the cylindrically shaped housing and extending between said two opposing structures, the channel terminating in an open end located both substantially concentric with the housing and between the two opposing structures, the hooked portions defining a passage extending through the housing transverse to the central longitudinal axis, said passage defining openings on opposing lateral sides of an exterior of the cylindrically shaped housing and through which the structure can be received;
a biased element provided in a cavity of said housing and extending along the central longitudinal axis, said biased element both providing a force along and movable along the central longitudinal axis of the housing, said passage being located between said cavity of said housing and said channel, said cavity of said housing communicating with said passage in a direction parallel to said central longitudinal axis, said passage communicating with said channel in a direction parallel to the central longitudinal axis, and said biased element extending from said cavity of said housing into said passage but being prevented from extending into the channel and to the channel open end by said biased element abutting the hooked portions;
wherein said biased element detachably clamps the structure against said passage when it extends through said passage; and
whereby the structure can be passed through the open end of the channel, and thereafter, clamped while extending through said passage.

2. The device according to claim 1, wherein said biased element has a structure engaging end and an end at which the biased element is detachably coupled to said housing, said structure engaging end has a biased position and an unbiased position, wherein said biased position is located in a direction opposite of a direction of the force created by the biased element.

3. The device according to claim 2, wherein the biased element is a spring and the spring is detachably coupled to said housing with a detachable threaded bushing.

4. The device according to claim 1, wherein the passage includes a beveled surface.

* * * * *